United States Patent [19]
O'Leary et al.

[11] Patent Number: 5,950,000
[45] Date of Patent: Sep. 7, 1999

[54] INTEGRATED OF A THIRD PARTY SOFTWARE TOOL

[75] Inventors: Daniel J. O'Leary, Mountain View; David A. Nelson-Gal, San Francisco, both of Calif.

[73] Assignee: Sun Microsystems, Inc., Mountain View, Calif.

[21] Appl. No.: 08/761,547

[22] Filed: Dec. 6, 1996

[51] Int. Cl.[6] .................................................. G06F 17/50
[52] U.S. Cl. ........................................................ 395/701
[58] Field of Search .......................... 395/701; 345/333, 345/334, 335, 348

[56] References Cited

U.S. PATENT DOCUMENTS

| | | | |
|---|---|---|---|
| 5,220,675 | 6/1993 | Padawer et al. | 345/333 |
| 5,361,360 | 11/1994 | Ishigami et al. | 395/712 |
| 5,642,511 | 6/1997 | Chow et al. | 395/701 |
| 5,671,415 | 9/1997 | Hossain | 395/701 |
| 5,710,926 | 1/1998 | Maurer | 395/701 |
| 5,754,858 | 5/1998 | Broman et al. | 395/701 |
| 5,758,160 | 5/1998 | McInerney et al. | 395/701 |
| 5,761,656 | 6/1998 | Ben-Shachar | 707/4 |
| 5,764,226 | 6/1998 | Consolatti | 343/333 |
| 5,765,162 | 6/1998 | Blackman et al. | 707/103 |

*Primary Examiner*—James P. Trammell
*Assistant Examiner*—Matthew Smithers
*Attorney, Agent, or Firm*—Sabath & Truong; Robert P. Sabath; John F. Schipper

[57] ABSTRACT

Methods, systems, and computer program products for integrating third party tools of an integrated software environment with an integrated environment manager. The graphical user interface of the integrated environment manager is augmented with an icon representing a selected third-party tool. Pulldown and pullright menus are controlled to show objects and files which have been used recently and by which tools. The tools and the integrated environment manager communicate through inter-process messaging to coordinate control of picklists in menus of the integrated environment manager and the tools integrated therewith.

25 Claims, 10 Drawing Sheets

INTEGRATED OF A THIRD PARTY SOFTWARE TOOL

CROSS-REFERENCE TO RELATED APPLICATION

Related applications include "METHODS, SYSTEMS, AND COMPUTER PROGRAM PRODUCTS FOR STORING, LOADING ANALYZING AND SHARING REFERENCES TO RECENTLY USED OBJECTS," U.S. patent Ser. No. 08/761,546 to Daniel J. O'Leary and Robin Jeffries and "METHODS, SYSTEMS, AND COMPUTER PROGRAM PRODUCTS FOR CONTROLLING PICKLISTS," U.S. patent Ser. No. 08/759,654 to Daniel J. O'Leary. Both applications are filed on even date herewith, and their contents are expressly incorporated herein by reference.

FIELD OF THE INVENTION

The present invention relates to the field of software development environments and more particularly to methods, systems, and computer program products for integrating third party tools into an integrated programming environment (IPE) which supports control and data integration.

BACKGROUND OF THE INVENTION

Current non-integrated software development environments are of limited support in completing software development projects. A lack of transition support between the development environments and the disconnected tools slows completion of projects. Inadequate integration includes inability to access particular software development tools, inability to track tool objects used and relied upon, and inability to track the impact of tool actions upon subsequently used software development tools. One kind of access problem occurs in transitioning from building a particular program to debugging it. If after building a particular program, debugging is desired, a completely different program invocation must separately be undertaken. If the user forgets the debugger name or location, the transition between building and debugging is blocked and software production stops.

Inefficiency and ineffectiveness further result when a particular programming environment fails to track objects pertaining to a recently used software tool. Text-based compilers, for example, do not remember most recently compiled files. Graphical tools similarly do not track file or macro objects which were recently used. The user is thus forced to enter particular object references for the earlier-used tool by manipulating a file chooser dialog box, for example, each time a follow-on tool is invoked. Thus, if a user wants to add desired new buttons to a graphical user interface (GUI) housed in an existing GUI builder file, the user typically must first bring up the GUI builder and "browse" its file hierarchy to get the path to the GUI builder file. This takes time and creates errors, consuming valuable resources.

Tool tracking problems further occur when a tool performs an action such as creating a file as a prelude to follow-on action by another tool. Multiple tools need to interact, such as when a make tool invokes a compiler linker to produce a program to be separately debugged. Tool interdependence is palpable when a collector produces an experiment to be processed separately by an analyzer, or when a GUI builder produces a make file to be processed separately by a make tool. The first acting tool does traditionally not inform follow-on tools operating on newly created objects of results of earlier processing. Accordingly, the user must intervene to specify applicable objects and object information tool by tool. In the meantime, the follow-on program tool languishes unproductively.

Known integrated software development environments such as Symantec's integrated C development environment or Borland's Turbo C environment, permit invocation of tool sets. However, the sets of tools invoked in such environments are pre-specified and already integrated within an applicable development environment by the creator of the development environment ab initio. The integration of additional tools which a user may want to use in connection with the particularly selected integrated software development environment is not permitted. A Sun Microsystems product called SPARCworks Manager, for example, puts severe restraints on third party tool integration. Limited integration of this product exists to allow centralized tool invocation and coordination between particular tools and a small set of actions including Restore, Minimize, Hide and Show messages. In X Windows, messages are sent by a window manager to applications to inform them that an X Windows session is ending. However, such minor information passing is of limited significance.

SUMMARY OF THE INVENTION

According to the present invention, third-party tools are included in an integrated programming environment having an inter-process messaging capability which distributes information from a first tool to other tools, when the first tool references or creates particular objects. According to an embodiment of the present invention, a microprocessor is operable according to software code for registration of third party tools and performance of inter-process communications to coordinate tool references to corresponding objects, to inform other tools when a first tool has generated a new object or reference to an object, and to integrate third party tools into a graphical user interface (GUI) for an integrated programming environment (IPE) manager.

According to the present invention, an integrated programming environment tracks how a software developer uses particular software programming environments, how the developer anticipates future user requests, and how the developer provides a flexibly and extensively customizable environment for tools to become available in the future. These and other aspects of the present invention will become clear to those skilled in the art in view of the description of the best presently known mode of carrying out the invention and the industrial applicability of the preferred embodiment as described herein and as illustrated in the several figures of the drawings.

DETAILED DESCRIPTION OF THE PREFERRED EMBODIMENTS

Figure 1:
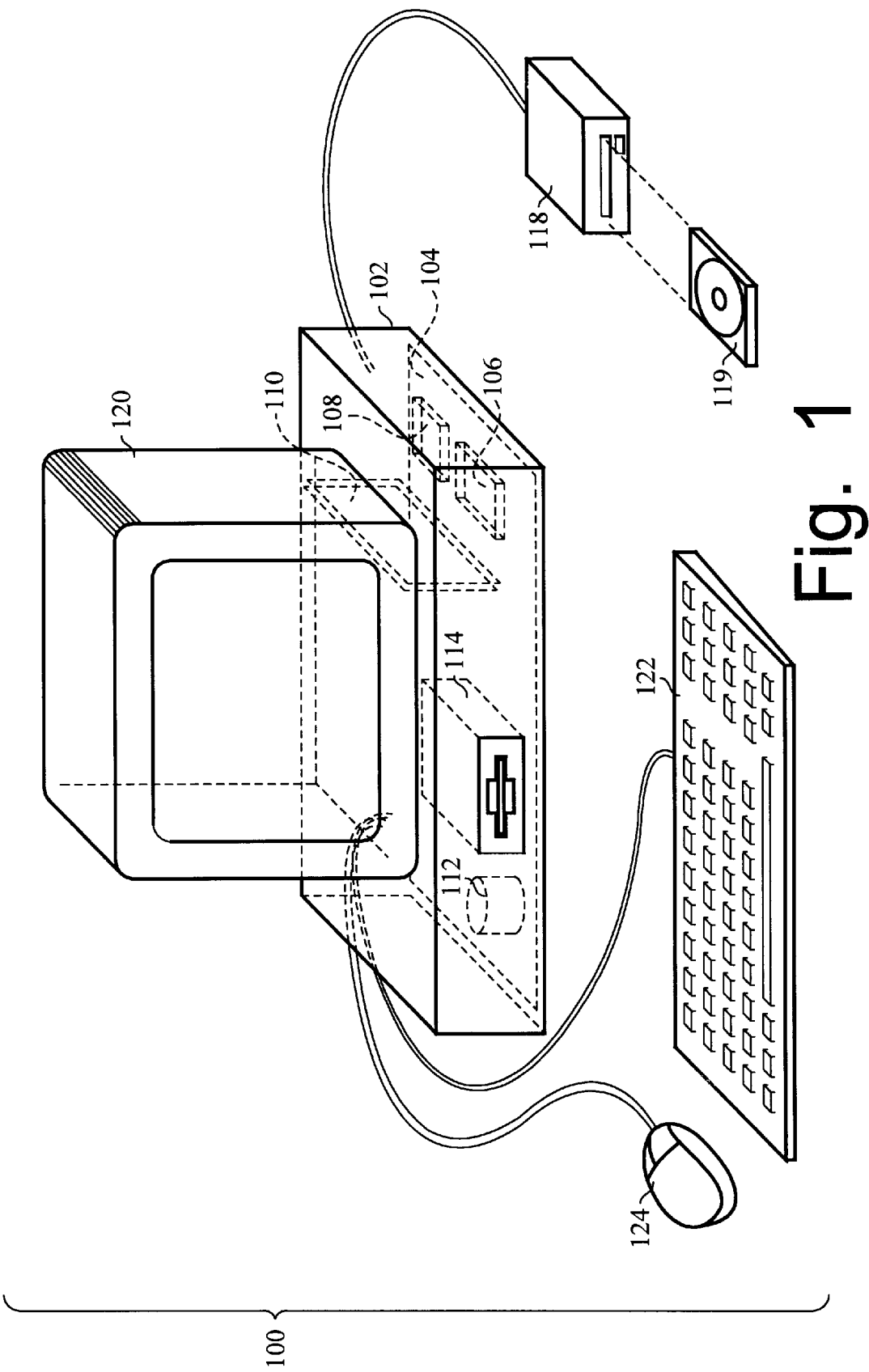
FIG. 1 is a schematic illustration of a current computer system for performing the method of the present invention.

FIG. 1 is a schematic illustration of a computer system 100 for tracking references to recently used objects and for integrating third party tools into a graphical integrated programming environment(IPE) according to the present invention. Computer system 100 includes a computer housing 102 which contains a motherboard 104 holding a central processing unit (CPU) 106, a memory 108, such as DRAM, ROM, EPROM, EEPROM, SRAM and Flash RAM, connected to CPU 106, and other optional special purpose logic devices, application specific integrated circuits (ASICs), and configurable logic devices such as GAL and reprogrammable FPGA. Computer system 100 also includes a display card 110, a hard drive 112, a disk drive 114, a disc drive 118, a compact disc 119, a monitor 120, and input devices such as a keyboard 122 and mouse 124. Display card 110 controls monitor 120. Other removable media devices including removable magneto-optical media (not shown) and other fixed, high density media drives can be interconnected with computer system 100 with an appropriate device bus such as a SCSI bus or an Enhanced IDE bus. Although compact disc 119 is shown in a CD caddy, it can be inserted directly into CD-ROM drives which do not require caddies. Also connected to the same or other device bus are high density media drives (not shown). Computer system 100 may additionally include a compact disc reader/writer unit (not shown), and a compact disc jukebox (not shown). Further, a printer (not shown) can be connected to provide printed listings of any of the referenced objects (e.g., files) used in the integrated software environment. Computer system 100 further includes at least one computer readable medium. Examples of computer readable media usable in connection with the present invention are compact discs 119, hard disks 112, floppy disks, tape, magneto-optical disks, PROMS, EPROM, EEPROM, Flash EPROM, DRAM, SRAM, and the like. Stored on any one or a combination of selected computer readable media, according to the present invention, is software for controlling both the hardware of computer system 100 and for enabling computer system 100 to interact with a human user. Such software in accordance with the present invention may include, but is not limited to, device drivers, operating systems and user applications, such as development tools. Such computer readable media further include computer program products in accordance with the present invention for tracking references to recently used objects and for integrating third party-tools into an integrated program environment (IPE).

The present invention is implemented on computer system 100 as implements the creation and maintenance of programs in an integrated programming environment using selected tools and facilities including an editor such as, for example, a vi editor, an Emacs editor, or a text tool editor), or other facilities including an assembler, a compiler (e.g., a compiler for C, C++, or Fortran), a linker, a make utility, a debugger, a profiler, a graphical user interface tool, and a version control system. The complexity of handling large software projects requires computer assistance for software maintenance in an integrated programming environment or "Workshop," which combines the individual tools under the control of an IPE manager. Integration eases transitions between separate kinds of programming tasks. According to the present invention, integration of software-based suite environments, including suites of applications such as a Lotus SmartSuite-type environment, for example, is facilitated, to assist manager control of multiple applications and coordination of data sharing between various end-user selected software applications. According to the present invention, coordinating and controlling application is an environment manager which includes a central graphical user interface (GUI). User level applications are referred to herein as environment applications, distinguishing them from the pure software development environment and from the tools or applications used for software development. The terms "tool" and "application" herein are used interchangeably, and they refer to both binary representations of the files affected, and to the process which is loaded and scheduled on the CPU.

Figure 2:
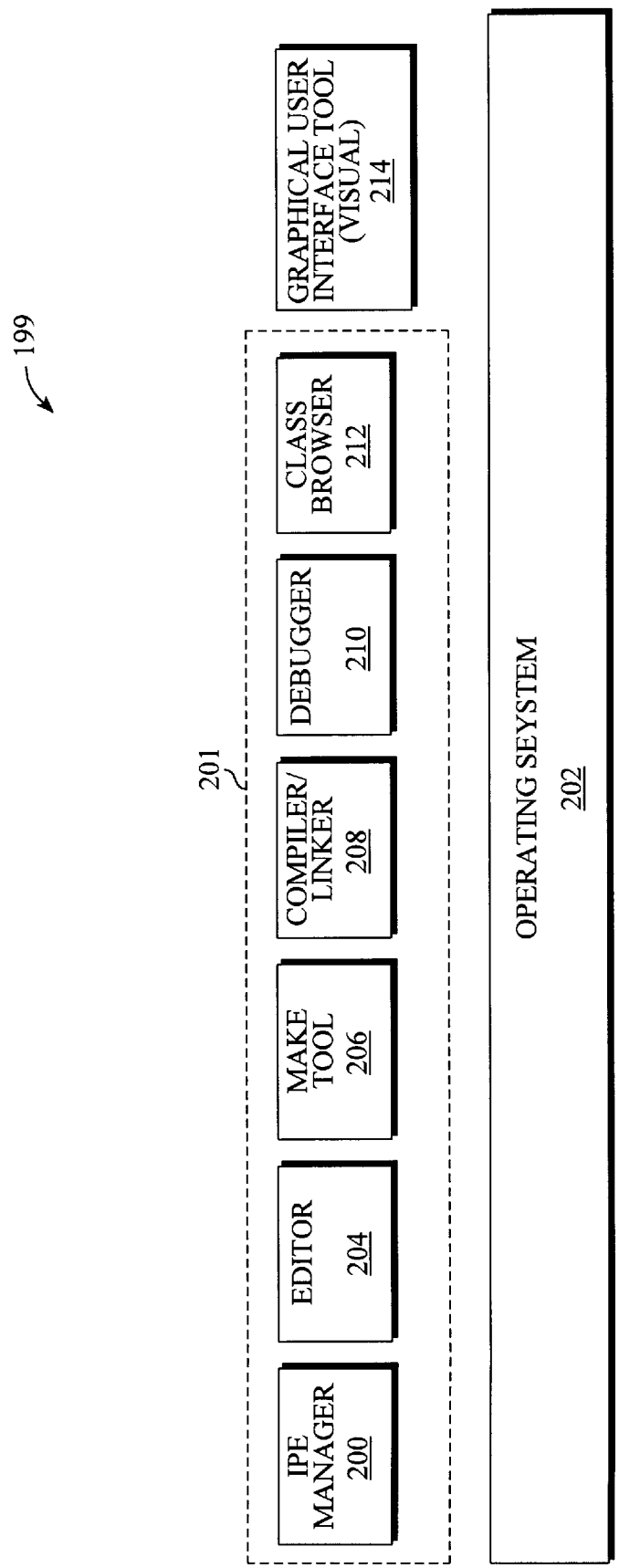
FIG. 2 is a block diagram of an integrated programming environment.

FIG. 2 is a process block diagram representing tools used in development of computer software applications in an integrated programming environment (IPE) according to the present invention. IPE 199 includes an IPE manager 200 and an operating system 202, and selected development tools including an editor 204, a make tool 206, a compiler linker 208, a debugger 210, a class browser 212, a graphical user interface (GUI) builder 214, and an analyzer (not shown). IPE manager 200 includes a graphical user interface (GUI) 300 shown in FIG. 8. Of these tools, IPE manager 200, make tool 206, compiler linker 208, debugger 240, and class browser 212 are part of selected integrated tools 201 of integrated development environment 199. Each of these tools is "bundled" with IPE manager 200 which has been informed a priori of the capabilities of the respective tools. File editing is central to software development, and many software development systems include a selected editor 204 through which a user can specify a preferred editor. Each such editor is an integrated tool 201 of IPE 199. A typical maintenance cycle for a software project begins by editing a source file to correct particular errors and to add code enhancements. Creating a new file version sets off a chain of events including invocation of make tool 206 to determine which files need to be recompiled and linked by compiler linker 208, based on the edited source file, to create a new program; and debugging the newly created program with debugger 210 to test effectiveness of the program fix or enhancement. This cycle is repeated several times until the fix or enhancement is correct.

Figure 3:
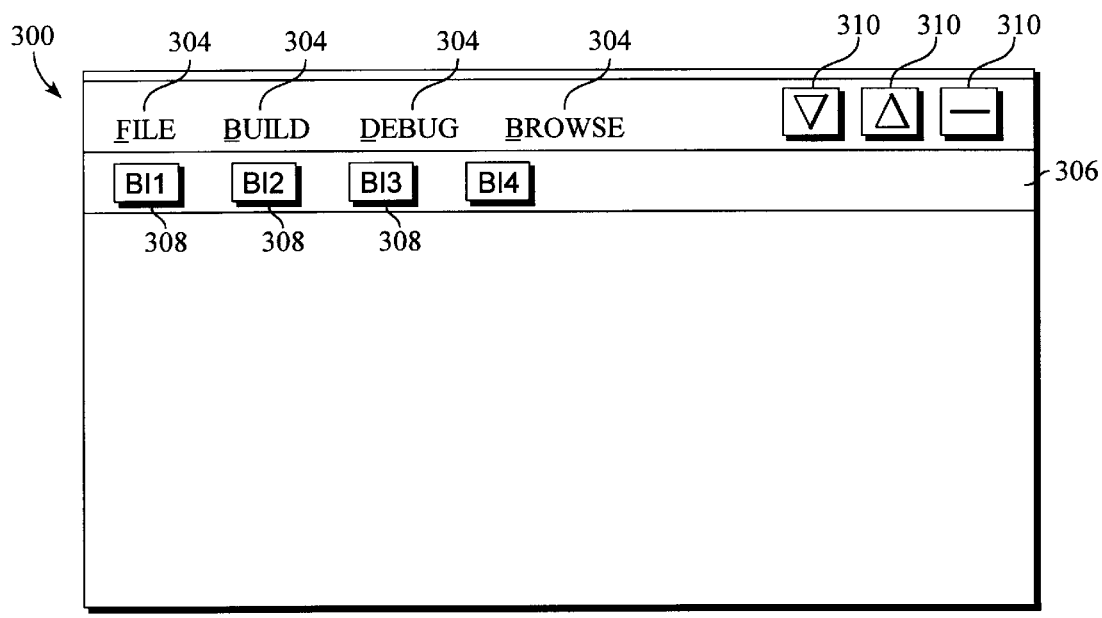
FIG. 3 is a schematic illustration of a graphical user interface of an integrated programming environment for operation of the present invention before any third-party tools have been added.

FIG. 3 shows a first window of graphical user interface 300 for IPE manager 200. IPE manager 200 includes integrated built-in icons BI1 through BI4. GUI window 300 includes integrated menu items 304 and an icon palette region 306 including a plurality of integrated icons 308. Integrated icons 308 represent the integrated tools 201 which are bundled with the IPE manager 200. GUI 300 further shows window control buttons 310 to control minimizing, maximizing, and closing GUI window 300. Although not shown, the frame of GUI window 300 can also include a menu for controlling window manager functions such as moving, sizing, minimizing, maximizing, and closing GUI window 300. IPE manager 200 also can be extended to support a session, i.e., a set of running applications under the control of a single IPE manager 300. Using sessions, IPE manager 200 can implement a control protocol to cause all the applications in a session to "Restore," "Minimize," "Hide," "Show" and "Quit" simultaneously.

However, integrated tools 201 do not necessarily represent all the tools that a developer will use in building a particular application. Other useful development tools such as graphical user interface builder 214 and a database manager (not shown) also assist in application development. For convenience, all tools that are not integrated tools 201 will herein be collectively referred to as "third-party tools." These third-party tools may be sold by the same or a different publisher as the integrated tools. In either case, it is beneficial to integrate these third-party tools with IPE manager 200 to avoid having to switch between IPE manager 200, when working with integrated tools, and a command shell or X terminal, when working with the third-party tools.

The degree of integration varies according to the present invention depending upon the degree desired. User access to a publisher vendor's tool may be sufficient integration. For vendors willing to invest in writing code, a tight level of integration is achieved by writing "glue code" to ensure reliability of third-party tool integration with IPE manager 200. Such custom integration can be achieved via vendor libraries dynamically loaded by IPE manager 200 upon invocation of corresponding tools from the icon palette 306. Third party developers can tightly integrate their applications with IPE manager 200 to match the specific needs of several developers with different third-party tools. To allow tighter integration of the IPE, third-party tool integration is supported by extending the GUI window 300 of IPE manager 200 in accordance with the present invention by adding icons and menu items. Thus, tools to be added register with the IPE manager 200, and IPE manager 200 generates a corresponding custom icon 408 in icon palette 306 for ease of invocation. Similarity, the menu bar is supplemented with a "Tools" menu name item 404 which acts as the central location for selecting third-party tools by menu. Registration includes informing IPE manager 200 of the name of the third-party tool to be added, informing IPE manager, in what directory it is located, and informing IPE manager what icon file should be added to the icon palette 306 to represent the tool in the icon field.

Figure 4:
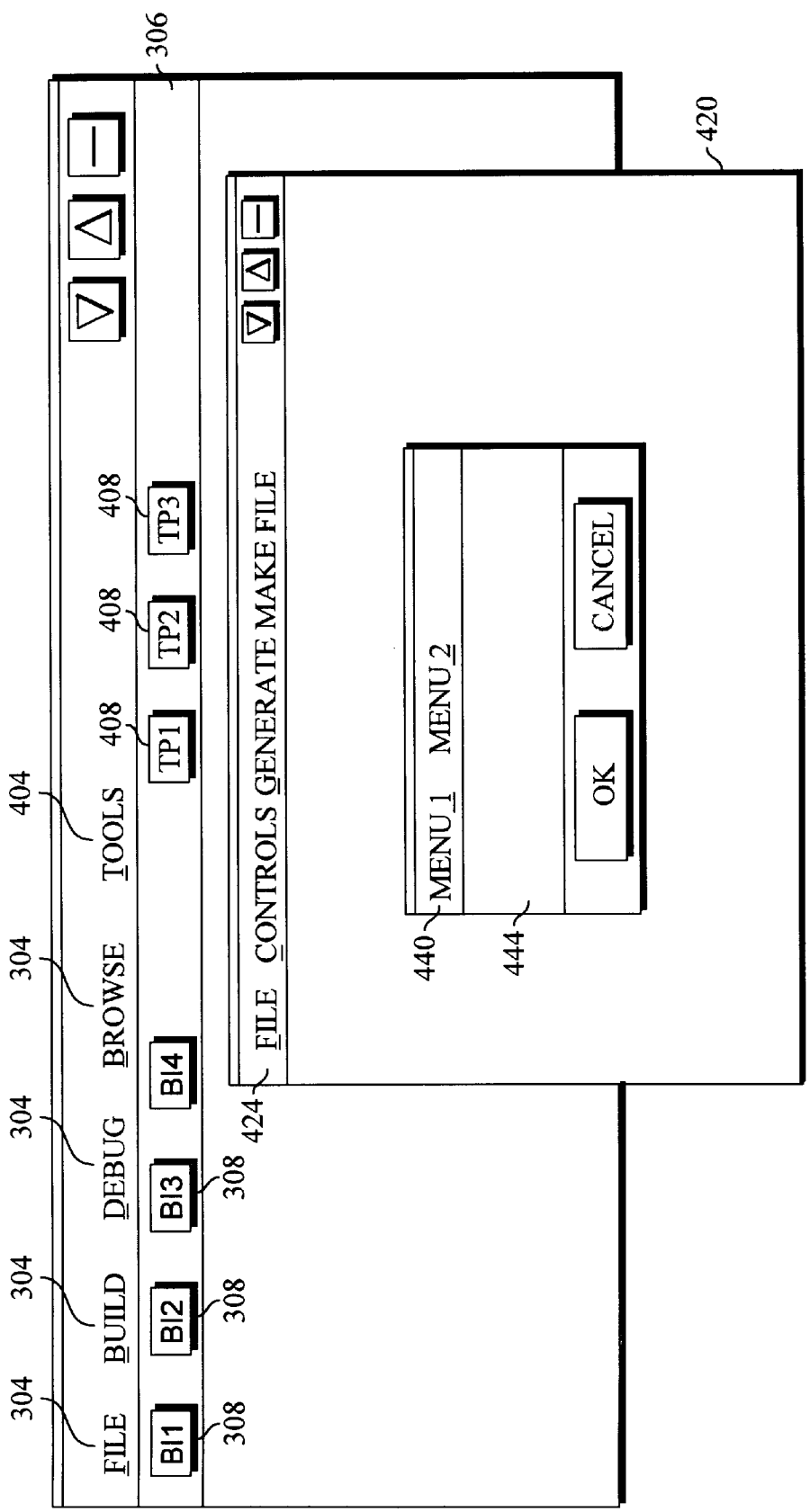
FIG. 4 is a schematic illustration of a graphical user interface of an integrated programming environment according to the present invention after three third-party tools have been added in accordance with the present invention.

To develop a GUI application by creating a new GUI builder file, GUI 300 of IPE manager 200 is supplemented with a third-party "tools" menu 404 and third party buttons 408 (FIG. 4). IPE manager 200 is invoked to initially display GUI 300. Then, GUI builder 214 is invoked through a Tools menu 404 located on GUI 300. The name of GUI builder 214 in this case is "Visual". Using GUI 420 of GUI builder 214, a shell or frame is created for the design, as well as a menu bar 440 and work area 444. The design is saved in a file called "/home/pat/src/app.xd" by using file menu 424 of GUI 420 of GUI builder 214. GUI builder 214 and IPE manager 200 are then closed down.

Figure 5:
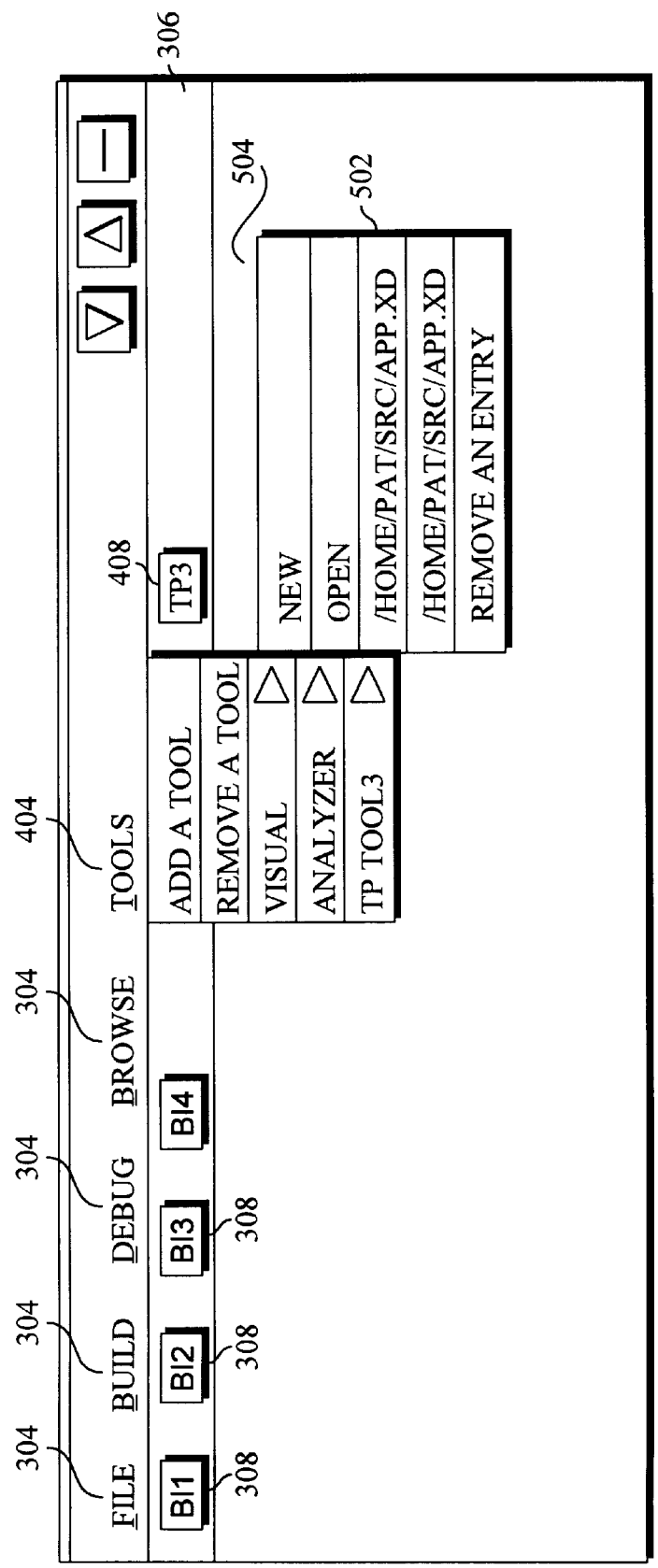
FIG. 5 is a schematic illustration of a graphical user interface of an integrated programming environment in accordance with the present invention after the Visual graphical user interface tool has been selected from the third party Tools menu.

FIG. 5 is a schematic illustration of GUI 300 resulting from the operations described above. When IPE manager 200 is next brought up and the Visual menu item is selected on Tools menu 404, on the pullright menu 504, there is a menu item with a reference to a file "/home/pat/src/app.xd" created by Visual. The pullright menu further includes entries labeled "New", "Open . . . ", and "Remove an entry". The "New" entries cause the IPE manager 200 to invoke application Visual without command line parameters, thereby indicating that Visual should start and generate a new GUI file. The "Open . . . " entry specifies that IPE manager 200 should display a file chooser dialog box so that the user can select a GUI file to be opened. Not all tools will support the "Open . . . " entry. Tools that are not interactive, such as the build/make tool 206, will have this entry omitted. When a file is selected, the IPE manager invokes Visual and specifies the selected file as a command line parameter. In addition, the name of the selected file is broadcast in a message so that applications which track references by Visual, like the IPE manager 200 and other running copies of Visual, can update their picklists and WorkSet information accordingly. When selecting a file, a file type and file filter are used to help reduce the number of files that the user has to select from. The method of specifying the file type and file filter are explained in greater detail below. The "Remove an entry" indication specifies that the user wishes to remove an entry from the picklist. This process removes a filename and is described in more detail in co-pending U.S. patent application Ser. No. 08/759,694, entitled "METHODS, SYSTEMS AND COMPUTER PROGRAM PRODUCTS FOR CONTROLLING PICKLISTS". In addition, the file name of the entry which is selected to be removed is placed in a message which is broadcast to other applications, including Visual, to cause the applications to also remove the entry from their respective picklist. Inter-process messaging is described in greater detail below.

By selecting the menu item 502, IPE manager starts Visual and commands the previous day Visual to load the file "app.xd" from directory "/home/pat/src." After adding some callbacks to the menu items and buttons, the "Generate Makefile" feature shown in FIG. 4 in the GUI 420 of the GUI builder 214 is invoked to create a makefile for the application. The makefile is saved as "/home/pat/src/Makefile".

Figure 6:
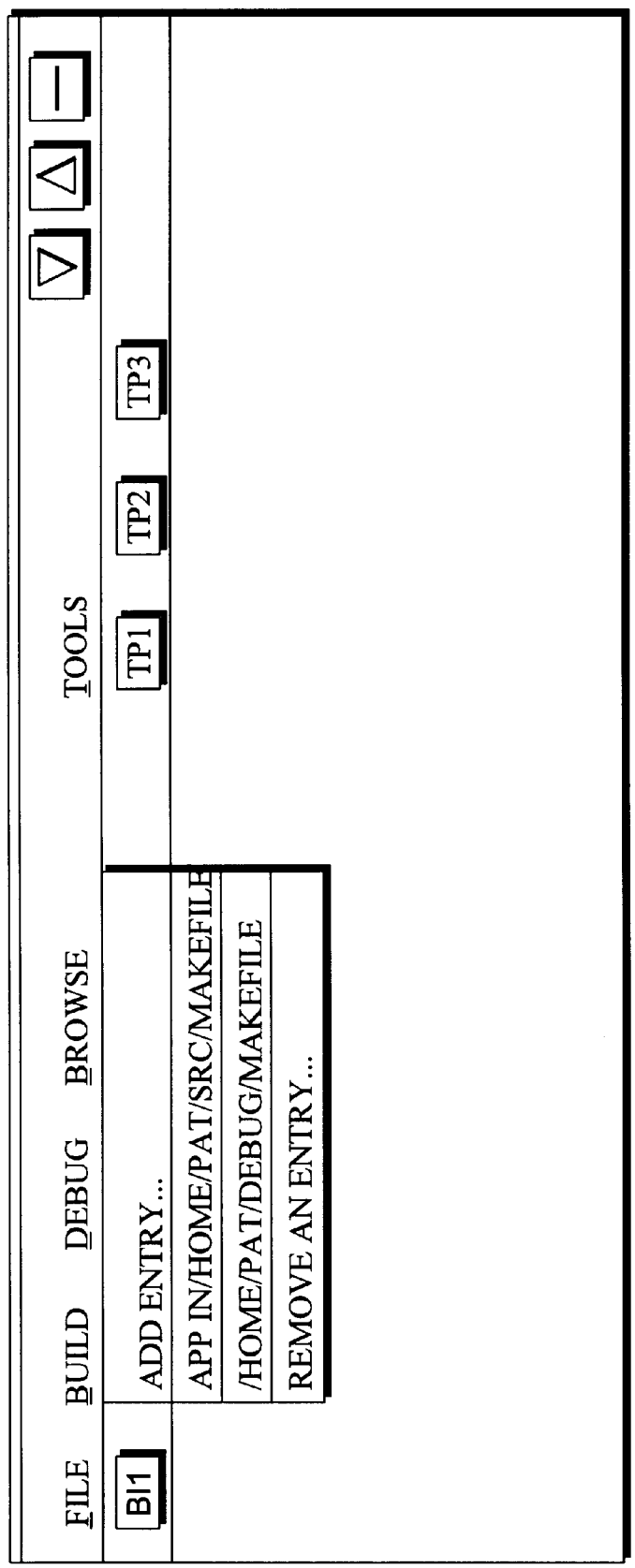
FIG. 6 is a schematic illustration of a graphical user interface of an integrated programming environment in accordance with the present invention after the build tool has been selected from the portion of the menu bar reserved for integrated applications.

FIG. 6 is a schematic illustration of the GUI 300 after the GUI builder 214 generates a makefile. The Build entry on the menu bar of GUI 300 is pulled down to disclose the target of make "app in /home/pat/src/Makefile" as the top reference on the build target picklist. In addition to saving the makefile, Visual broadcasts the existence of the new makefile in a message. When IPE manager 200 receives the message, it is recognized as a message from a registered tool and is added to the appropriate picklist. Next, the target "app" is selected and the application builds using the commands in the makefile corresponding to the target "app". Selected syntax errors are fixed and build is reissued, either by using the Build menu again, or by simply selecting the BI2 Build button 308 on the icon palette 306 of the GUI 300. In general, when an integrated icon 308 or a custom icon 408 is selected, IPE manager 200 invokes a corresponding integrated or third-party tool using the top reference on the corresponding picklist. For tools that do not support the "Open . . . " syntax, the tool is invoked without any additional parameters.

Figure 7:
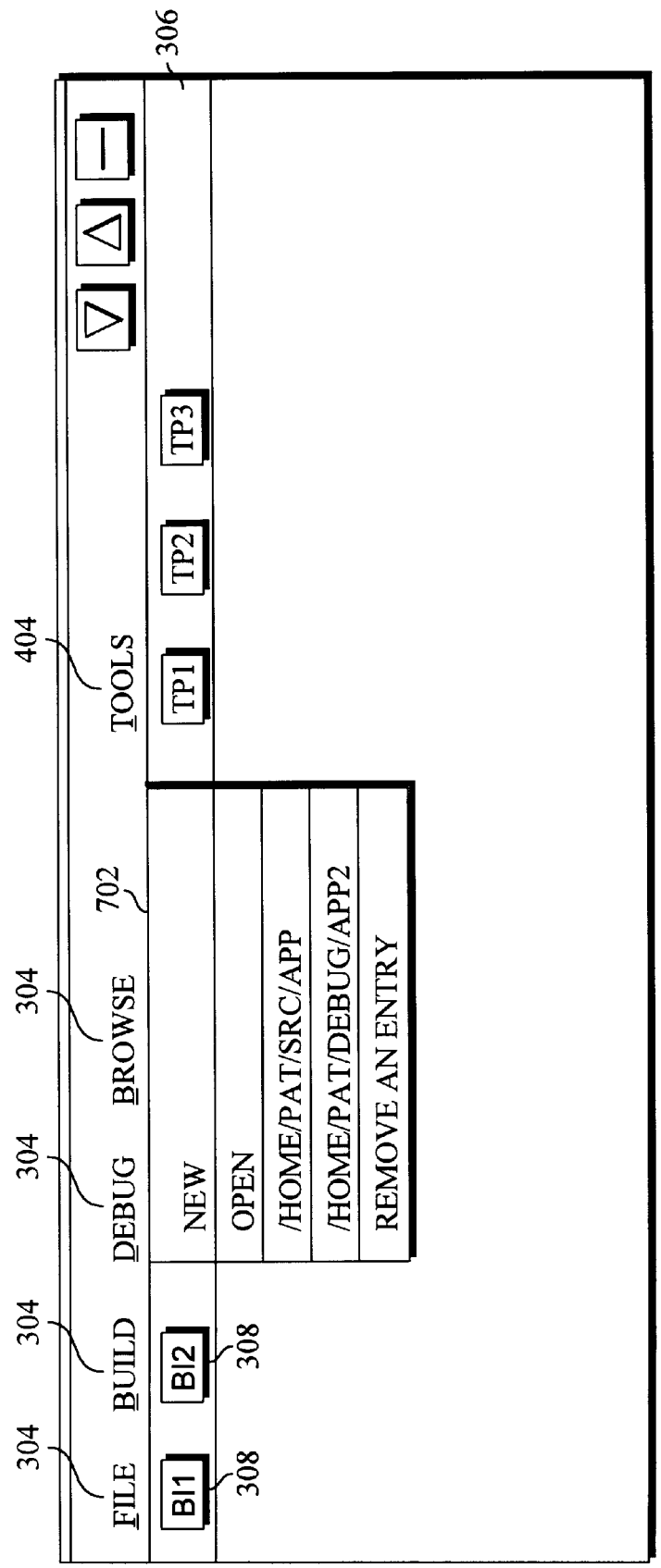
FIG. 7 is a schematic illustration of a graphical user interface of an integrated programming environment in accordance with the present invention after the debug tool has been selected from the portion of the menu bar reserved for integrated applications.

After a successful build operation, debug of the program is undertaken. FIG. 7 is a schematic illustration of the result of successfully building the target "app" in "/home/pat/src/Makefile". The Debug menu is selected from the menu bar and a reference to the program "/home/pat/src/app" appears at the top of Debug picklist 702. This reference exists, because the build tool broadcasts in a message the name of each target which is successfully built, if the target is an application. As with messages received from Visual, IPE manager 200 parses the message and adds the entry to a corresponding picklist. This program is selected from the picklist, and the debugger loads the program. Alternatively, alteration of the BI3 Debug button 308 on the icon palette 306 on the GUI 300 additionally permits starting of debugger to begin debut operation on the selected GUI application.

According to another embodiment of the present invention, collector and analyzer tools in Workshop are employed to analyze performance of a new application. Accordingly, IPE manager 200 is launched and the target program is loaded into the debugger by selecting the BI3 debug button 308 on the icon palette 306 of GUI 300. To collect performance data on the target application, the collector window is brought up from the Windows menu of the debugging window. The collector options are set up so that profile data is collected for anticipated function calls, and the name of the experiment is changed from test.1.er to app.1.er. During the program run, the collector puts performance data in a set of files inside of the experiment directory. This experiment can be viewed after the program run with the analyzer tool. Through the debugger, the application is run through its performance bottleneck. The collector is then turned off and the collector window is closed.

Figure 8:
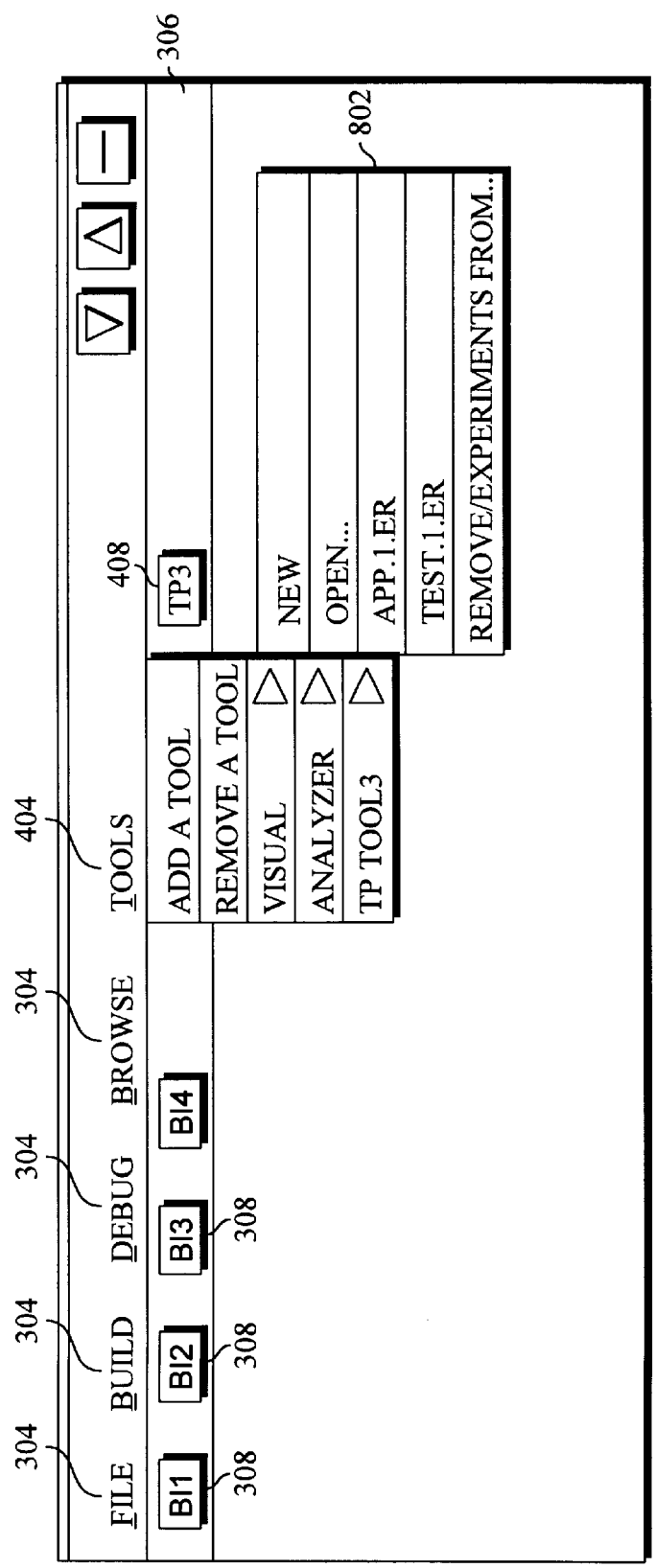
FIG. 8 is a schematic illustration of a graphical user interface of an integrated programming environment in accordance with the present invention after the Analyzer tool has been selected from the third party Tools menu.

To view the performance data, Tools menu 404 is entered to identify the Analyzer menu item. The Analyzer menu item to look at the pullright menu is selected and discloses the experiment "/home/pat/src/app.1.er" entry appears first in the analyzer picklist 802 (FIG. 8). This entry was added by broadcast of a message from the collector when the collector window was closed. This item on the picklist 802 is selected, and the analyzer tool appears loaded with the data from the collector run.

Using the analyzer, the functions causing the poor performance are found. The needed modifications are made and the results are verified. A new release of the application is created. As these two examples show, the present invention not only can track references to recently used objects, it also can notify a second tool that a first tool has generated a new object or object reference that the second tool can use. Therefore, the present invention anticipates the steps used by a developer in the development process. Additionally, a tool vendor can integrate a third-party application with the other elements of the IPE, according to the present invention.

A management tool, Release Constructor, is for example selected for integration. Partial integration with the IPE is enabled in accordance with the present invention by using a configuration file and a custom icon previously created, including an icon file containing a pixel image of the tool. The configuration file specifies the name of the tool, the path to the icon file, and an indication that no messages are handed by his application. The configuration file is placed in the IPE manager directory with a special file name extension. The tool also can alternatively be added by selecting the "Add a tool" menu item (as shown in FIG. 5). When selecting this item, the user specifies a directory of where the configuration file can be found. The manager 200 then includes a reference to this file in its own initialization file. Therefore, even with minimal effort, tool integration is possible which allows Release Constructor to be launched by selecting the menu item or custom icon corresponding to Release Constructor on the GUI 300 of the IPE manager 200.

According to the present invention, tighter integration is possible for a Visual GUI builder product shipped with the Visual workshop. To produce a tight integration with the Workshop and to take advantage of integration opportunities, a configuration file for Visual is created. The file filter and the file type for the application are specified, and participation in the protocols which will allow Visual to have both control and data integration with the workshop are established. To participate in the control and data protocols, Visual is altered so that it can handle seven inter-process (e.g., ToolTalk) messages. The first four messages are control messages which allow Visual to act as part of the IPE in terms of global environment operations. These operations include window operations (maximize, minimize, show and hide) and shutdown of the environment. In addition, the application is updated to generate and respond to messages that deal with the project server (or data) protocol. These messages allow the IPE manager 200 and Visual to maintain a list of objects used by the GUI builder when building files for the user. This list is kept by the IPE manager 200 inside the Visual section of the Tools menu 404. As the user opens files using Visual, Visual broadcasts a message which is received by the IPE manager 200. The message includes the file reference for the file that Visual opened. In addition, if Visual is maintaining a list of recently used files, Visual receives its own message and adds the file reference to its own picklist of recently used files. In this way, the IPE manager 200 and Visual build lists of references in parallel.

The application is extended to enable transmission of messages to add references to other tools. Visual allows the user to create a makefile to be used to compile a GUI program. Code is added to Visual so that whenever a makefile is written by Visual, Visual broadcasts a message, to be received by IPE manager 200, indicating the name of the makefile. In response, as was described with reference to FIG. 6, the IPE manager 200 adds the reference to the Build menu. This message allows the user to easily transition to building the GUI program by clicking the BI2 Build tool icon 308 button from the icon palette 306 on the GUI 300 of the IPE manager 200. Afterwards, the program can be debugged by clicking the BI3 debug icon 308.

After implementing the two messages described above, integration with the edit server is desired so that the user can use an editor of choice to specify and change code for widget callbacks. The edit client library is thus built into Visual and editor integration is tested. After editing callbacks, the edit server will send a message to the Build menu to indicate that the application target needs to be rebuilt. The user has been permitted to use the same edit session to create callbacks in Visual, to fix syntax errors resulting from compiling the callbacks, and to step through the callback code using the debugger.

Figure 9:
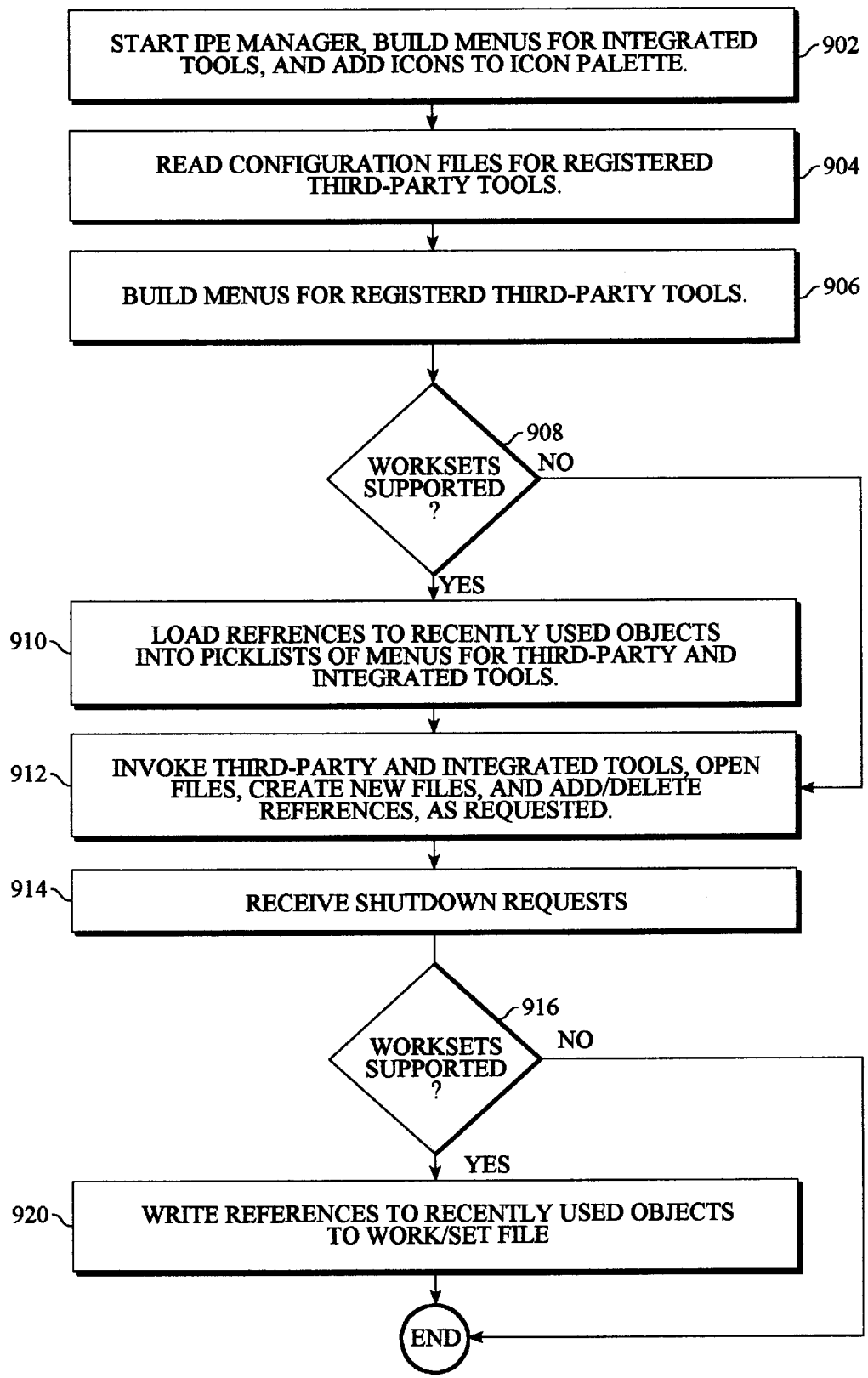
FIG. 9 is a flowchart showing the method of using an integrated programming environment in accordance with the present invention.
Figure 10:
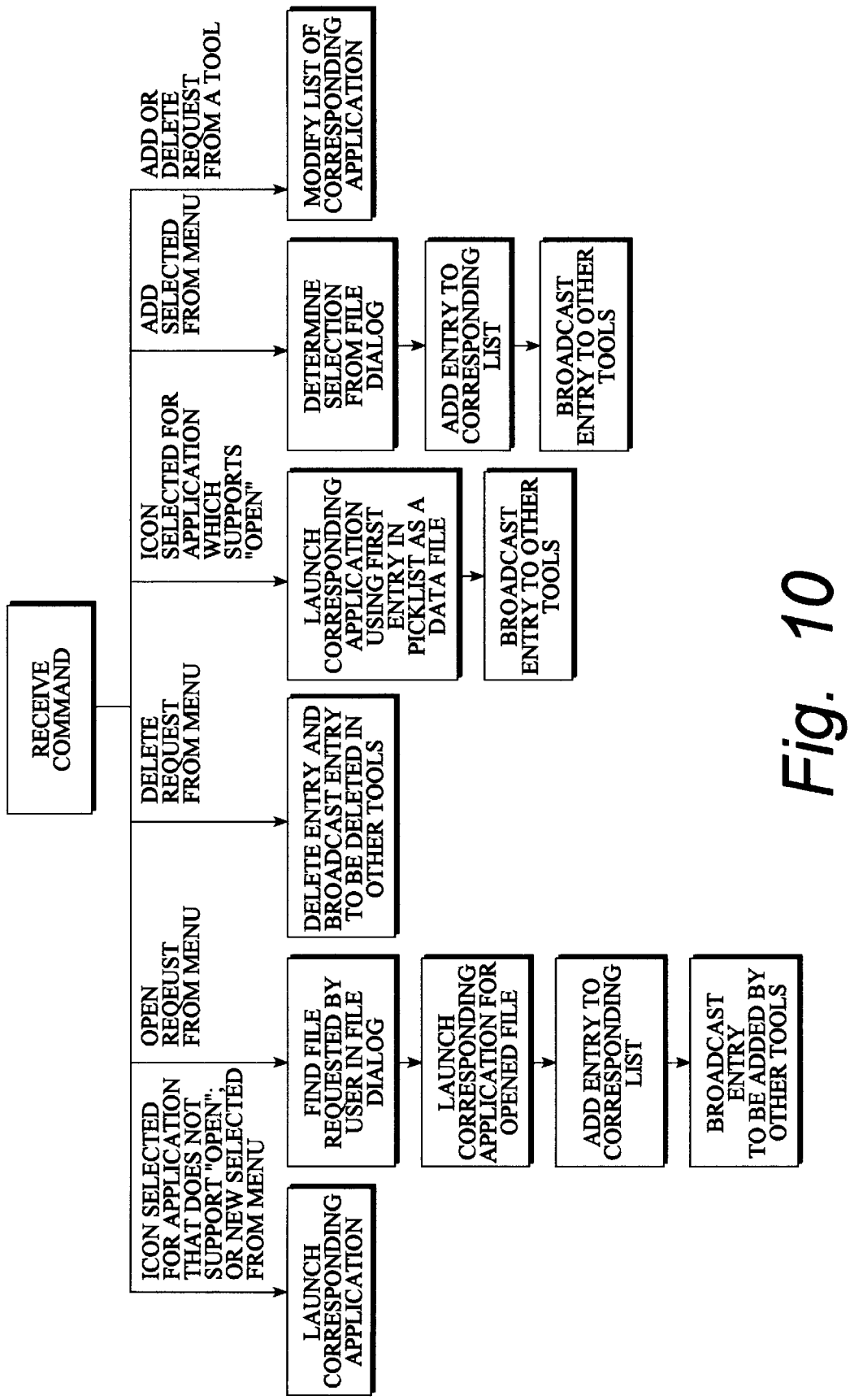
FIG. 10 is an illustration of a decision tree showing commands to which an integrated programming environment responds in accordance with the present invention.

Turning now to the general process of using the present invention, the flowchart of FIG. 9 shows the overall process of utilizing an IPE manager 200 with integrated and third-party tools. When IPE manager 200 is started, it builds GUI 300 using the menus and icons for the integrated tools 201, as shown in step 902. According to step 904, IPE manager 200 reads the configuration files for registered third-party tools. According to step 906, menus are built for the registered third-party tools found in step 904. According to step 908, a determination is made whether WorkSets are supported, and if so, the process continues with step 910. According to step 910, IPE manager 200 loads the WorkSet and populates the picklists with corresponding entries from WorkSet, as described in more detail in co-pending U.S. patent application Ser. No. 08/761,546, entitled "METHODS, SYSTEMS AND COMPUTER PROGRAM PRODUCTS FOR STORING, LOADING ANALYZING AND SHARING REFERENCES TO RECENTLY USED OBJECTS." Control passes to step 912 where IPE manager 200 fields requests using the GUI 300 and receives messages from integrated tools and third-party tools. This process is shown in greater detail in FIG. 10. When the user is finished, control passes to step 914 when a shutdown request is received. Step 916 determines if WorkSets are supported. If so, the process continues with step 920. According to step 920, recently used references are written out to a WorkSet to describe recent interactions by a user with several of the tools.

In light of the general process described above, the following sections provide an overview of the tool integration architecture according to the present invention, including the formats for tool integration protocol and the configuration file. The overview begins by showing the process and protocol map for the tool integration architecture. Here, the function of the messages for the control and data protocols are described. Next the role of the configuration file is discussed. Finally, the impact of the tool integration feature on the startup process for the IPE manager 200 and other components of the integrated tools 201 is presented.

As described above, the relationship between IPE manager 200 and the integrated or configured third-party tool processes is illustrated in FIG. 2. Messages flow for the data and control protocols between the IPE manager and the integrated and third-party tools. The transport mechanism for the protocol is the ToolTalk messaging library. Where possible, a standard ToolTalk message is used to implement a protocol message. The ToolTalk message specification is published by Sun Microsystems, Inc., of Mountain View, Calif. and is described in *Tooltalk and Open Protocols* by Astrid M. Julienne and Brian Holtz (SunSoft Press 1994). These references are incorporated herein by reference in their entirety.

The control protocol allows IPE manager 200 to issue requests to intergrated tools and to third party tools, which permits the tools to act as an integrated part of the IPE. This protocol also is used for global environment operations such as window operations (including, but not limited to, restore, minimize, show, and hide) and shutdown of the environment. The messages to do this are Set_Iconified, Set-Mapped, and Quit. Tools only receive these messages from IPE manager 200 and do not send them. The last message in the control protocol is the "Started" message. This message is used by the tools to indicate their presence to the IPE manager 200. The Started message is used for session management and to signal the initiation of the data protocol between the IPE* manager and the tools. This message is discussed further in below.

The data protocol is a bidirectional message stream used to transmit object references between the IPE manager 200 and each tool. This protocol particularly permits tools to transmit object references to each other and to track object references so that a WorkSet for the current project can be created. Inter-tool messaging is useful in situations where the output of one tool serves as the input to another, as was discussed above. Messages supporting this protocol include "AddToolDataRefs" for adding tool files, "DeleteToolDataRefs" for deleting specified tool files and "DeleteAllToolDataRefs" for clearing out the list of files appearing in the tool picklist and project section viewer. The "AddToolDataRefs" message occurs in response to a user opening a file from the tool, adding a file to the project section using the project viewer or when a project file is opened. Project files are opened when a WorkSet is opened as is discussed in the above-referenced and incorporated co-pending application Ser. No. 08/761,546 "METHODS, SYSTEMS, AND COMPUTER PROGRAM PRODUCTS FOR STORING, LOADING, ANALYZING, AND SHARING REFERENCES TO RECENTLY USED OBJECTS". The "DeleteToolDataRefs" message occurs when the user deletes files from a picklist appearing in either the tool or the IPE manager 200, or when a user deletes files from the project viewer. The "DeleteAllToolDataRefs" message is sent by the IPE manager 200 before opening a new project (or WorkSet) so that the menus can be cleared of the references belonging to a previous WorkSet.

As was described above, a tool declares its participation in IPE integration by placing a configuration file in a special directory, e.g., the lib/<LOCALE>/toolConfig (where <LOCALE> defaults to C) directory within the IPE installation. Within this file, each tool identifies itself and indicates its level of participation in the integration protocol.

This section describes the core set of attributes each tool must include, and then discusses variations of tool integration. The core set of attributes in the configuration file relate to tool identification and whether or not the tool supports the "Open . . . " idiom. These attributes are name, label, iconfile, command, opensupport, TtVersion and helpstring. The tool name attribute is an internal identifier used by the tool integration mechanism. The label attribute is the string presented to the user in the Tools menu. The iconfile attribute is the name of the file containing the pixmap which for display of the tool's button on the tool bar. The command attribute is the command line used to invoke the tool. The format of the command attribute is discussed in more detail in section on tool startup. The "opensupport" attribute is a Boolean declaring whether or not the tool supports the "Open . . . " idiom. Finally, the TtVersion attribute indicates which version of the integration message protocol the tool supports. The help string is displayed in the GUI 300 of the IPE manager 200 when the user positions the mouse over a tool's button in the icon palette 306. There are two tool integration variations which are selected according to whether or not the tool supports the "Open . . . " idiom. For those tools which do support this idiom, tools may or may not support the data protocol. The first variation is for those tools which do not support the "Open . . . " idiom. Release Constructor described above is one such tool. Each tool in this variation has an icon which appears on the icon palette 306 and its name appear on the tools menu 404. However, it will not have a pullright for its tools menu item, nor will it have a section in the project viewer which displays WorkSets. An example configuration file for a second application (Filemerge) which also does not support the "Openfile" paradigm is shown below in Table I. The table structure is laid out similar to an X resource file.

TABLE I

| | |
|---|---|
| pwToolbox.version: | 2.0 |
| pwToolBox.tools: | filemerge |
| pwToolBox.filemerge.name: | filemerge |
| pWToolBox.filemerge.label: | File Merge |
| pwToolBoX.filemerge.vendor: | SUNW |
| pwToolBox.filemerge.version: | 3.0 |
| pwToolBox.filemerge.iconFile: | filemerge.xpm |
| pwToolBox.filemerge.command: | filemerge |

TABLE I-continued

| | |
|---|---|
| pwToolBox.filemerge.TtVersion: | 4.0 |
| pwToolBox.filemerge.helpString: | Filemerge - merge different versions of files |
| pwToolBox.filemerge.newSupport: | False |
| pwToolBox.filemerge.openSupport: | False |

The second variation is for those tools which support the "Open . . . " idiom. These tools may optionally support the data message protocol. Tools that do support the data message protocol process incoming data protocol messages in their message callback and send them out at the appropriate time. In addition to the core set of attributes, tools of this embodiment of the present invention specify at least the type of file chooser used in both the Open menu item on the tools menu pullright and in the project viewer to add files. This is done using the "filetype" and "filefilter" attributes. The filetype attribute can have the values "File" or "Directory". The filefilter attribute is used to filter the file chooser viewer using a regular expression string.

After specifying the file chooser specification, tools according to that representation customize their command attribute to allow for the passing of the file argument when the tool is invoked with a file to open. The "fileArgFormat" attribute is a printf string used to format the file argument to allow for command switches used to indicate a file to open. The default format for this attribute is "%s". The formatted result of this attribute is appended to the command string before invocation. If a command line flag were required, the flag would also be specified in the same string. For example, "-file %s" generates a "-file" command-line argument before the name of the file. An example of a tool of this variation is the Analyzer program. Its configuration file is listed below in Table II.

TABLE II

| | |
|---|---|
| pwToolBox.version: | 2.0 |
| pwToolBox.tools: | analyzer |
| pwToolBox.version: | 2.0 |
| pwToolBox.analyzer.name: | SUNW_SPRO_Analyzer |
| pwToolBox.analyzer.label: | Analyzer |
| pwToolBox.analyzer.vendor: | SUNW |
| pwToolBox.analyzer.version: | 2.0 |
| pwToolBox.analyzer.iconFile: | analyzer.xpm |
| pwToolBox.analyzer.helpString: | Analyzer-analyze application performance data |
| pwToolBox.analyzer.TtVersion: | 4.0 |
| pwToolBox.analyzer.command: | analyzer |
| pwToolBox.analyzer.newSupport: | True |
| pwToolBox.analyzer.openSupport: | True |
| pwToolBox.analyzer-fileType: | Dir |
| pwToolBox.analyzer.fileArgFormat: | % s |
| pwToolSBx.analyzer.addObjectLabel: | Add Experiment |
| pwToolBox.analyzer.deleteObjectsLabel: | Delete Experiments |
| pwToolBox.analyzer.removeFromMenuLabel: | Remove experiments from menu... |

Another example of a configuration file for a type of tool such as the Visual program, appears below in Table III.

TABLE III

| | |
|---|---|
| pwToolBox.version: | 2.0 |
| pwToolBox.tools: | Visual |
| pwToolBox.visual.name: | SUNW_SPRO_Visual |
| pwToolBox.visual.label: | Visual |
| pwToolBox.visual.vendor: | SUNW |
| pwToolBox.visual.version: | 4.0 |

TABLE III-continued

| | |
|---|---|
| pwToolBox.visual.iconFile: | visual.xpm |
| pwToolBox.visual.TtVersion: | 4.0 |
| pwToolBox.visual.helpString: | Visual - create visual applications |
| pwToolBox.visual.command: | Visual |
| pwToolBox.visual.newSupport: | True |
| pwToolBox.visual.openSupport: | True |
| pwToolBox.visual.fileType: | File |
| pwToolBox.visual.fileFilter: | *.xd |
| pwToolBox.visual.fileArgFormat: | % s |
| pwToolBox.visual.addObjectLabel: | Add Design |
| pwToolBox.visual.deleteObjectsLabel: | Delete Designs |
| pwToolBox.visual.removeFromMenuLabel: | Remove an entry... |

Tool integration features according to the present invention are substantially active during startup of the IPE manager 200 and associated integrated tools. This section describes the sequences of events related to tool integration when the IPE manager 200 and configured tools are invoked. The first action of IPE manager 200 at startup is to read the tool configuration files located underneath the configuration directory, e.g., lib/sunpro_defaults directory. For each tool, the following is done: 1) a button is added to icon palette 306 using the specified pixmap file, 2) a menu item is added to the Tools menu 404, and if the tool supports the "Open . . . " idiom, then a pullright menu containing a New menu item, and an Open menu item and a file picklist are created and attached as tool menu items; and 3) the tool is added to the tools registry, so that the tool type is registered and the tool is given its own section in the Project/WorkSet file.

Once the tool configuration files have been processed, IPE manager 200 opens up a project (WorkSet file) for the user. This is either a new project or the project the user had open the last time the IPE manager 200 was up. Before opening the project, the IPE manager 200 sends a "DeleteAllToolDataRefs" message to clear out its picklists and the tool picklists. After opening the project, the project section viewer is populated along with the picklists for each tool. The picklists include those for the built-in and configured tools, located on the tools menu 404 as pullrights). Next, IPE manager 200 sends a "AddToolDataRefs" message for each section belonging to a configured tool. This message allows a list of files to be specified. Since IPE manager 200 registers for this message, it will receive it and can use it to populate the project viewer and its tool pullright menu picklists.

To participate in a tool session managed by IPE manager 200, a tool must be invoked by the user selecting the tool from the tools menu 404 in the GUI 300 (or by selecting the tool's button on the icon palette 306). Once the tool menu item is selected, a command string is constructed using the tool's command attribute. The command string references the name of the bound tool. Some tools which support a file argument can have the file argument appended to the command line using the fileArgFormat attribute specified in the tools configuration file. The fileArgFormat attribute allows for file argument conventions specific to each tool.

After the command string is constructed by IPE manager 200, the tool is launched using the command string. Once the tool comes up, it sends a "Started" message to the IPE manager 200. IPE manager 200 uses the "Started" message to register the tool with the current session associated with the IPE manager 200 process. This allows IPE manager 200 to issue control messages to all the tools in its session (i.e. Restore/Maximize/Hide/Show/Quit). If the tool supports the data protocol, IPE manager 200 will send the tool its project section data using the "AddToolDataRefs" message. The tool can use this message to populate its picklist if it has implemented it.

The following sections describe in greater detail the messages sent according to the control protocol. The messages include the "started", "stopped", "Set-Iconified", "Set-Mapped", and "Quit" messages. The Started Message is sent from a tool to IPE manager 200 after the tool has been launched by IPE manager 200. The message has the following format:

---
Started <vendor> <toolName> <toolVersion>
Context: <groupID> <pid>
---

This message has five arguments. The first argument is the vendor string. This indicates the organization which supplies the tool. The second argument is the toolName string. It is the same used by IPE manager 200 to determine which type of tool has started. It should match the tool name in the tool configuration file. The third argument is the toolversion string. It indicates the version of the started tool. The groupID and pid arguments are passed via the ToolTalk message context. The groupID argument is used to allow the IPE manager 200 to know if the tool belongs to its session. The pid argument is the process id of the tool sending the message.

The "Stopped" message is sent from a tool to the IPE manager 200 just before the tool quits (usually by the user's request). The message has the following format:

---
Stopped <vendor> <toolName> <toolVersion>
Context: <groupID> <pid>
---

This message has five arguments. The first argument is the vendor string. This indicates the organization which supplies the tool. The second argument is the toolName string. It is the name used by the to determine which type of tool has stopped. It should match the tool name in the tool configuration file. The third argument is the toolversion string. It indicates the version of the stopped tool. The groupID and pid arguments are passed via the ToolTalk message context. The groupID argument is used to allow the IPE manager 200 to know if the tool belongs to its session. The pid argument is the process id of the tool sending the message.

The "Set_Iconified" message is sent by the IPE manager 200 to each tool to perform the Restore and Minimize messages. The format of this message is:

---
Set-Iconified <iconify>
Context: <groupID>
---

The iconify argument is a boolean value. True means the tool is to iconify (Minimize) and False means the tool should de-iconify (Restore). The groupID argument is a context argument used to allow the IPE manager 200 to know if the tool belongs to its session.

The "Set_Mapped" message is sent by the IPE manager 200 to each tool to perform the Show and Hide messages. The format of this message is:

---
Set_Mapped <map>
Context: <groupID>
---

The map argument is a boolean value. True means the tool is to map itself (Show) and False means the tool should unmap itself (Hide). The group ID argument is a context argument used to allow the IPE manager 200 to know if the tool belongs to its session.

The "Quit" message is sent by the IPE manager 200 to each tool before the IPE manager 200 shuts down. The format of the message is:

---
Quit <silent> <force> <operation2Quit>
Context: <groupID>
---

The <silent> argument affects user notification of termination. If silent is True, the tool is not allowed to block on user input before terminating itself (or the indicated operation). If it is False, however, the tool may seek such input. The force argument is a Boolean value indicating whether the tool should terminate itself (or the indicated operation) even if circumstances are such that the tool ordinarily would not perform the termination. The "operation2Quit" argument is used to optionally indicate an operation to abort. When the IPE manager 200 sends this message it will set this argument NULL since it wants the semantic which means to bring the tool down. The groupID argument is a context argument used to allow the IPE manager 200 to know if the tool belongs to its session.

The set of messages for tool data integration are described in more detail below and include: AddToolDataRefs, DeleteToolDataRefs and DeleteAllToolDataRefs. These messages are to be sent to the ToolTalk session as a broadcast available to all processes currently joined to the ToolTalk session. The "AddToolDataRefs" message is used to announce a tool and a list of files which it can open. The format of this message is:

---
AddToolDataRefs <groupID> <toolname> <toolIDataRefs>
<fileCount>
---

The groupID argument is used to confine the message to just those tools started by the IPE manager 200. The tool argument is a string used to identify the tool which can operate on the list of files. The tool data refs argument is a set of strings which represent files which the tool can operate on. This message is sent by the tool when it opens a file. It is also sent by the IPE manager 200 after it opens a project section owned by the tool. When a tool receives this message it can populate its picklist with the list of files (if it supports a picklist). When the IPE manager 200 receives this message, it adds the list of files to the tool's pullright picklist menu and to the tool's section in the project viewer.

The DeleteToolDataRefs message is used to announce a tool and a list of files which are to be deleted from the associated tool picklist. The format of this message is:

---
DeleteToolDataRefs <groupID> <toolName>
<toolDataRefs> <FileCount>
---

The group ID argument is used to confine the message to just those tools started by the IPE manager 200. The tool argument is a string used to identify the tool which can operate on the list of files. The tool data refs argument is a set of strings which represent files which are to be deleted. This message is sent by the tool when a user has deleted files from the tool picklist. It is sent by the IPE manager 200 when a user has deleted files from either the tool's pullright picklist menu or the tool's section in the project viewer. When a tool receives this message it deletes the files from the picklist (if it supports a picklist). When the IPE manager 200 receives this message, it deletes the list of files from the tool's pullright picklist menu and to the tool's section in the project viewer.

The DeleteAllToolDataRefs message is used to announce that all tool files are to be deleted from the associated tool picklist. The format of this message is:

---
DeleteAllToolDataRefs <groupID> <toolName>
---

The groupID argument is used to confine the message to just those tools started by the IPE manager 200. This message is sent by the IPE manager 200 before it opens a project. When a tool receives this message, it deletes all the files.

The tool configuration file format is described below in greater detail. The file format used in the Xdefaults format which supports an attribute-value scheme. The configuration file can be used to specify one tool or a set of tools. The general format of the file is shown in Table IV below.

TABLE IV

---
pwToolBox.version: 2.0
pwToolBox.tools: <toolname1> <toolname2> ...
<toolnameN>
<toolname1> attributes
<toolname2> attributes
...
<toolnameN> attributes
---

The first two attributes (version and tools) are generic attributes. These attributes apply to everything within the scope of the configuration file. The first attribute indicates the version of the file. This allows the configuration file reader to determine what attributes to look for. The version for the IPE manager 200 has been described herein as version 2.0. The second attribute lists the tools which are contained in the file. Following this, the attributes for each tool are listed. The format for the tool attributes follows:

---
pwToolBox.<toolname>.<attrname>:          <attrvalue>
---

Each attribute value will typically be either a string or a boolean. The strings can be interpreted in a variety of ways based on the intent of the attribute. A description and format for each support attribute is described in more detail below. The tool name attribute is the internal identifier used by the tool integration mechanism. It should be a string which is as unique as possible (i.e. something like SUNW_PROWORKS_ToolName where SUNW represents the company and PROWORKS represents the product line). The format of this attribute is:

---
pwToolBox.<toolname>_name:
<string>
---

The label attribute is the string presented to the user in the Tools menu. The format of this attribute is:

---
pwToolBox. <toolname>.label: <string>.
---

The version attributes is a string representing the version of the tool described in the configuration file. This attribute is presented by the tool to the IPE manager 200 when it sends the Started message. The format of this attribute is:

---
pwToolBox.<toolname>.version: <string>
---

The default for this attribute is "1.0".

The vendor attribute is a string identifying the company supplying the tool (i.e. SUNW) described in the configuration file. This attribute is presented by the tool to the IPE manager 200 when it sends the started message. The format of this attribute is:

pwToolBox.<toolname>.vendor: <string>

The default of this attribute is "NoVendor".

The iconfile attribute is the name of the file containing the pixmap which will be displayed in the tool's button on the tool bar. If not supplied, a button will not be placed on the button bar. However, if the label attribute is specified, a menu item will be placed in the Tool's menu. The format of this attribute is:

---
pwToolBox.<toolname>.iconFile:
<filename>
---

The filename can either be a fully qualified path or the basename of the file. The latter assumes that the icon file is located in the workshop install area under the lib/icons directory.

The command attribute is the command line used to invoke the tool. This minimally includes the name of the tool binary. Those tools which support the "Open . . . " idiom should specify the fileArgFormat attribute if the file argument is specified in a nonstandard way. The format of this attribute is:

---
pwToolBox.<toolname>.command:          <cmdline>.
---

The TtVersion attribute indicates which version message protocol the tool supports. The format of this attribute is:

---
pwToolBox.<toolname>.TtVersion:          <version-string>.
---

The default for this attribute is "4.0."

The helpstring attribute value is displayed in the IPE manager 200 main window footer when the user positions the mouse over a tool's button in the IPE manager 200 tool button bar. The format of this attribute is:

---
pwToolBox.<toolname>.helpString:
<string>
---

The default for this attribute is "No help available for this tool".

The newSupport attribute is a boolean value declaring whether or not the tool's pullright menu will have the "New" menu item. This attribute only makes sense when the tool turns on the opensupport attribute. The "New" menu item launches the tool without any arguments. The format of this attribute is:

pwToolBox.<toolname>.newSupport:
<boolean>

The default for this attribute is False.

The opensupport attribute is a boolean declaring whether or not the tool supports the "Open . . . " idiom. Those tools which take a file or directory argument or support an Open menu item in their user interface should set this attribute to True. The format of this attribute is:

pwToolBox.<toolname>.openSupport: <boolean>

The default for this attribute is False.

The fileArgFormat attribute is a printf string used to format the file argument to allow for command switches used to indicate a file to open. The default format for this attribute is "%s". The formatted result of this attribute is appended to the command string before invocation. It is expected that the string contain the sub-string "%s" so that the file to be opened can be properly substituted.

pwToolBox.<toolname>.fileArgFormat: <print>-strings.

The filetype attribute is used to configure the type of file chooser used in both the Open menu item on the tool's menu pullright and in the project viewer to add files. The format of this attribute is:

pwToolBox.<toolname>-FileType:
<File/Dir>

Values for this attribute can be "File" for a regular file chooser and "Dir" for a directory chooser. The default for this attribute is "File".

The filefilter attribute is also used to configure the type of file chooser used in both the Open menu item on the tools menu pullright and in the project viewer to add files. The format of this attribute is:

pwToolBox.<toolname>.fileFilter:
<string>.

Values for this attribute can be a regular expression string used to filter the view for regular file choosers. Note this filter is not used for a directory chooser. The default for this attribute is "*". The addObjectLabel attribute is used to indicate the label of the button in the project viewer window which adds objects to the given project section. This attribute only makes sense for those tools which turn on the opensupport attribute. The format of this attribute is:

pwToolBox.<toolname>.addObjectLabel: <string>

The default for this attribute is "Add File".

The openObjectLabel attribute is used to indicate the title of the chooser which comes up from the tool menu pullright when the "Open . . . " item is selected. This attribute only makes sense for those tools which turn on the opensupport attribute. The format of this attribute is:

pwToolBox.<toolname>-openObjectLabel: <string>

The default for this attribute is "Open File".

The deleteObjectsLabel attribute is used to indicate the label of the button in the project viewer window which deletes objects from the given project section. This attribute only makes sense for those tools which turn on the opensupport attribute. The format of this attribute is:

pwToolBox.<toolname>.deleteObjectsLabel:
<string>

The default for this attribute is "Delete Files".

The removeFromMenuLabel attribute is used to indicate the label of the menu item in the tool menu pullright which removes objects from the pullright picklist. This attribute only makes sense for those tools which turn on the opensupport attribute. The format of this attribute is:

pwToolBox. <toolname>.removeFromMenuLabel:
<string>

The default for this attribute is "Remove files from menu . . . ".

In addition to the configuration file described above, the IPE manager 200 can also support WorkSets as described in greater detail in co-pending U.S. application Ser. No. 08/761,546, entitled "METHODS, SYSTEMS AND COMPUTER PROGRAM PRODUCTS FOR STORING, LOADING ANALYZING AND SHARING REFERENCES TO RECENTLY USED OBJECTS." To support tools which integrate with the Workshop, the project file format will include a section for each configured tool nature of the data for these tools is a list of files, the former of the tool's project section will use the existing project file format to contain this data.

In general the section format appears in Table V below.

TABLE V

%%<toolname>
[<toolname>
   (currentDirectory <directory>
   (ObjectList
    {
    <File1>
    . . .
    <FileN>
   })]

By using this format, WorkSets which describe the interactions of tools, can be generated and loaded to recreate the recent process steps of a development cycle.

The above discussions have been described with reference to the IPE manager 200 adding and deleting items based on messages from tools. In addition, tools have been described which respond to messages from the IPE manager 200 by adding or deleting entries from their corresponding picklists. However, if the IPE manager 200 and the tools perform these processes independently, the picklists of the IPE manager 200 and the individual tools can become mismatched. Co-pending application Ser. No. 08/759,694, entitled "METHODS, SYSTEMS AND COMPUTER PROGRAM PRODUCTS FOR CONTROLLING PICKLISTS," describes that it is possible to have entries which are not textually equivalent but which are nonetheless equivalent. A cited example is that a full electronic mail address and an alias are synonymous and both entries should not be placed in a picklist. However, if the intelligence for this "equivalency" testing is contained solely within the internals of the tools, IPE manager 200 will not have filtered out entries that a tool has filtered out. Therefore, in another embodiment of the present invention, the IPE manager 200 is augmented with dynamically loadable code in the form of a dynamically linked library, a shared object, etc. IPE manager 200 can then test messages in the same way as the tools to determine if an entry is redundant with respect to another entry, even though the two entries are not textually equivalent.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

What is claimed is:

1. A method of integrating an integrated environment application and a third-party environment application with an environment manager, the method comprising the steps of:

providing an environment manager having a graphical user interface, (GUI) including an icon palette with an integrated icon corresponding to an integrated environment application, and further including a menu bar with an integrated menu for the integrated environment application;

providing a mechanism for selecting a third-party environment application for integration with the environment manager;

providing a mechanism for adding a third-party menu for the third-party environment application to the menu bar;

providing a mechanism for receiving a command from a user based on an interaction with at least one of the icon palette, the integrated menu and the third-party menu;

providing a mechanism for launching at least one of the integrated environment application and the third-party environment application based on a command received; and providing a mechanism for adding an icon for the third-party environment application to the icon palette.

2. The method according to claim 1, further comprising the steps of:

reading a WorkSet of references to at least one recently used object; and populating said integrated menu and said third-party menu with least one reference.

3. The method according to claim 1, further comprising the steps of:

receiving a command that alters at least one of said integrated menu and said third-party menu; and altering the at least one of said integrated menu and said third-party menu based on said command received in the receiving step.

4. The method according to claim 3, wherein said step of altering comprises at least one of a) adding an entry to the one of said integrated menu and said third-party menu, b) removing an entry from said at least one of said integrated menu and said third-party menu, and c) reordering entries on said at least one of said integrated menu and said third-party menu.

5. The method according to claim 1, further comprising the steps of:

receiving a message from said integrated environment application; and updating said third-party menu based on the message received from said integrated environment application.

6. The method according to claim 1, further comprising the steps of:

receiving a message from said third-party environment application; and updating said integrated menu based on the message received from said third-party environment application.

7. The method according to claim 1, further comprising the steps of:

receiving a message from a second third-party environment application; and updating said integrated menu based on the message received from said third-party environment application.

8. The method according to claim 1, further comprising the steps of:

receiving a message from a second integrated environment application; and updating said integrated menu of said first integrated environment application based on the message received from the second integrated environment application.

9. A system integrating an integrated environment application and a third-party environment application with an environment manager, the system comprising:

an integrated environment application;

a third-party environment application; and an environment manager comprising:

a graphical user interface (GUI), including an icon palette with an integrated icon corresponding to an integrated environment application, and further including a menu bar with an integrated menu for the integrated environment application;

a third-party menu adder configured to add a third-party menu to the menu bar for the third-party environment application;

a command receiver configured to receive a command from a user based on an interaction with at least one of the icon palette, the integrated menu and the third-party menu;

a launcher configured to launch at least one of the integrated environment application and the third-party environment application; and wherein the environment manager further comprises a writer configured to store a WorkSet of references to at least one recently used object in a non-volatile storage medium.

10. The system according to claim 9, wherein said environment manager further comprises:

a reader configured to read a WorkSet of references to at least one recently used object; and a menu update device configured to populate said integrated menu and said third-party menu with at least one reference read by the reader.

11. The system according to claim 9, wherein said command receiver comprises a receiver configured to receive a command that alters at least one of the integrated menu and the third-party menu; and wherein said environment manager further comprises a menu update device configured to alter at least one of said integrated menu and said third-party menu based on the command received by the receiver.

12. The system according to claim 11, wherein said menu update device comprises at least one of:
   a) an entry adder configured to add an entry to said at least one of said integrated menu and said third-party menu;
   b) an entry remover configured to remove an entry the at least one of said integrated menu and said third-party menu; and
   c) a reordering device configured to reorder entries on said at least one of said integrated menu and said third-party menu.

13. The system according to claim 9, wherein said environment manager further comprises:
   a message receiver configured to receive a message from said integrated environment application; and
   an update device configured to update said third-party menu based on the message received from said integrated environment application.

14. The system according to claim 9, wherein said environment manager further comprises:
   a message receiver configured to receive a message from said third-party environment application; and
   an update device configured to update said integrated menu based on the message received from said third-party environment application.

15. The system according to claim 9, wherein said environment manager further comprises:
   a message receiver configured to receive a message from a second third-party environment application; and
   an update device configured to update said third-party menu of said third-party environment application based on the message received from the second third-party environment application.

16. The system according to claim 9, wherein said environment manager further comprises:
   a message receiver configured to receive a message from a second integrated environment application; and
   an update device configured to update said integrated menu of said integrated environment application based on the message received from the second integrated environment application.

17. A computer program product, comprising:
   a computer storage medium and a computer program code mechanism embedded in the computer storage medium for causing a computer to integrate an integrated environment application and a third-party environment application with an environment manager, the environment manager having a graphical user interface (GUI) including an icon palette with an integrated icon corresponding to the integrated environment application and further including a menu bar with an integrated menu for the integrated environment application, the computer code mechanism comprising:
      a first computer code device configured to add an icon for the third-party environment application to the icon palette;
      a second computer code device configured to add a third-party menu to the menu bar for the third-party environment application;
      a third computer code device configured to receive a command from a user based on an interaction with at least one of the icon palette, the integrated menu and the third-party menu;
      a fourth computer code device configured to launch at least one of the integrated environment application and the third-party environment application; and
      a fifth computer code mechanism configured to store a WorkSet of references to at least one recently used object in a non-volatile storage medium.

18. The computer program product according to claim 17, wherein said computer program code mechanism further comprises:
   a sixth computer code mechanism configured to read said WorkSet of references to said at least one recently used object; and
   a seventh computer code mechanism configured to populate at least one of said integrated menu and said third-party menu with said references read by the sixth computer code device.

19. The computer program product according to claim 17, wherein said third computer code device comprises a sixth computer code device configured to receive a command that alters at least one of said integrated menu and said third-party menu; and
   wherein said computer code mechanism further comprises a sixth computer code device configured to alter at least one of said integrated menu and said third-party menu based on the command received by the sixth computer code device.

20. The computer program product according to claim 19, wherein said sixth computer code device comprises at least one of:
   a seventh computer code device configured to add an entry to said at least one of said integrated menu and said third-party menu;
   an eighth computer code device configured to remove an entry to said at least one of said integrated menu and said third-party menu; and
   a ninth computer code device configured to reorder entries on said at least one of said integrated menu and said third-party menu.

21. The computer program product according to claim 17, wherein said computer code mechanism further comprises:
   a sixth computer code device configured to receive a message from said integrated environment application; and
   a seventh computer code mechanism configured to update said third-party menu based on the message received from said integrated environment application.

22. The computer program product according to claim 17, wherein said computer code mechanism further comprises:
   a sixth computer code device configured to receive a message from said third-party environment application; and
   a seventh computer code mechanism configured to update said integrated menu based on the message received from said third-party environment application.

23. The computer program product according to claim 17, wherein said computer code mechanism further comprises:
   a sixth computer code device configured to receive a message from a second third-party environment application; and
   a seventh computer code device configured to update said third-party menu of said first third-party environment application based on the message received from the second third-party environment application.

24. The computer program product according to claim 17, wherein said computer code mechanism further comprises:
   a sixth computer code device configured to receive a message from a second integrated environment application; and a seventh computer code device configured to update said integrated menu of said first integrated environment application based on the message received from the second integrated environment application.

25. A method of integrating an integrated environment application and a third-party environment application with an environment manager, the method comprising the steps of:

providing an environment manager having a graphical user interface (GUI) including an icon palette with an integrated icon corresponding to an integrated environment application, and further including a menu bar with an integrated menu for the integrated environment application;

selecting a third-party environment application for integration with the environment manager;

adding a third-party menu for the third-party environment application to the menu bar;

receiving a command from a user based on an interaction with at least one of the icon palette, the integrated menu and the third-party menu; launching at least one of the integrated environment application and the third-party environment application; and adding an icon for the third-party environment application to the icon palette.

* * * * *